United States Patent [19]
Riggi, Jr.

[11] Patent Number: 5,368,056
[45] Date of Patent: Nov. 29, 1994

[54] VEHICLE SHADING SYSTEM

[76] Inventor: Jack Riggi, Jr., 8416 Pennsylvania Blvd., Fort Myers, Fla. 33912

[21] Appl. No.: 222,894

[22] Filed: Apr. 5, 1994

[51] Int. Cl.5 .......................... E04F 10/00; E04F 10/06
[52] U.S. Cl. ................... 135/88.07; 135/903; 160/67
[58] Field of Search ............... 135/88, 90, 103, 105, 135/106, 903; 160/66, 67, 310, 311; 296/163

[56] References Cited

U.S. PATENT DOCUMENTS

| | | | |
|---|---|---|---|
| 3,826,271 | 7/1974 | Sattler et al. | 135/903 |
| 3,847,171 | 11/1974 | Akers et al. | 135/903 |
| 3,952,758 | 4/1976 | Addison et al. | 135/903 |
| 4,160,458 | 8/1979 | Marceluis | 135/903 |
| 5,148,848 | 9/1992 | Murray et al. | 160/66 |
| 5,292,169 | 3/1994 | O'Brian | 160/67 |

FOREIGN PATENT DOCUMENTS

2582338 11/1986 France ......................... 135/88

*Primary Examiner*—Carl D. Friedman
*Assistant Examiner*—Wynn E. Wood
*Attorney, Agent, or Firm*—John C. Lambertsen

[57] ABSTRACT

A vehicle shading system has a control system which automatically deploys and retracts an awning for shading a recreational vehicle. Several mechanisms are mounted atop and in the side of the vehicle for providing shade on different areas adjacent to the vehicle as well as on the vehicle itself. In one configuration, shade is simultaneously provided for both one side and one portion of the roof of the vehicle. In another configuration, shade is provided for both sides and the entire roof of the vehicle.

27 Claims, 3 Drawing Sheets

VEHICLE SHADING SYSTEM

BACKGROUND OF THE INVENTION

1. Field of the Invention

The present invention relates generally to an awning apparatus for a vehicle, and more particularly to automated shading apparatus to be used with recreational vehicles and trailers.

2. Description of the Related Art

Camping in recreational vehicles such as trailers and motor homes has become a very popular form of vacationing in this country and abroad. These types of vehicles are appealing to many as they allow the vacationer to make use of inexpensive campsites, located both in urban areas and in desirable wilderness locations, yet still provide most of the amenities of a motel or house. Specifically, these vehicles are typically equipped with sleeping, kitchen, and bathroom facilities.

Upon arrival at a desired location, a vacationer sets up camp by simply parking the recreational vehicle in a designated area. In rural areas, the campsite often includes a fire ring and a picnic table. The recreational vehicle functions as a place for sleeping, washing, and cooking. Where available, the area outside of the vehicle can be used to set up chairs and tables to add further to the rest and relaxation of this camping experience. The level of "improvements" can vary greatly among the campsites, and in many parts of the country, very little in the way of shade is available—with no trees or shade constructions provided. Consequently, many currently available recreational vehicles are optionally equipped with awnings attached to the side of the recreational vehicle, which are used to provide shade for the outside area adjacent to the vehicle. These awnings are typically secured to one side of the recreational vehicle, normally on the side containing the main entrance to the vehicle. By utilizing a spring-loaded roller, the awning is kept rolled up against the side of the vehicle when stored and not in use. Attached support members are provided to retain the awning when it is pulled outward from the roller, and assist to position and maintain the awning in one or more "shade" configurations.

For the vacationer to deploy the awning, he or she must pull the awning with the attached support members away from the vehicle until the support members and the awning are in a selected, deployed configuration. Furthermore, when becomes necessary or desirable to store the awning, such as for a wind storm or when it is time to leave, the vacationer must physically maneuver the support members to release them from the support position, permitting the spring-loaded awning to roll up and the storage arms return to the stored position along the side of the recreational vehicle.

As can be appreciated, these awnings with their attached support members are often quite heavy, making for very cumbersome deployment and storage operations for the average vacationer. Adding to this problem is the fact that many users of these recreational vehicles are older, retired persons for whom extensive physical labor is often difficult. As can easily be imagined, these older RV owners often experience tremendous difficulties in deploying and storing the awnings.

A further difficulty with the typical prior art awnings is that they only shade that area adjacent to the side of the vehicle upon which they are mounted. Oftentimes, it is the recreational vehicle itself that is in need of shade. Specifically, when the recreational vehicle is parked in the hot sun, the interior of the recreational vehicle becomes very warm. Cooling the inside of the recreational vehicle to provide comfort, such as during the day for relaxing or at night for sleeping, often requires that the vacationer operate an air conditioning system or fans located inside of the vehicle. Use of these types of devices to cool the recreational vehicle from its daytime heating results in a greater use of the vehicle's electrical generator or motor than is desirable. In fact, this lack of shade for the recreational vehicle in warmer climates marks an inefficient and expensive use of the available power supplies.

A need thus exists for an awning that can be deployed without requiring undo physical labor on the part of the vacationer. Further, there is also a need for an awning that can provide shade for the vehicle itself, in addition to those areas located outside adjacent to the vehicle, where the vacationer might also rest and relax.

SUMMARY OF THE INVENTION

The above-mentioned disadvantages of the prior art are overcome by the present invention. Briefly stated, the present invention provides novel improvements to a vehicle shading system, providing an awning that is automatically deployed from a recreational vehicle. The awning also can provide shading for the vehicle and for areas adjacent to the vehicle.

In one embodiment, the vehicle shading system includes a control system, an awning, a top mechanism for deploying an apparatus for shading a roof, and a side mechanism for shading an area adjacent to a side of the vehicle.

The control system is operated from a position preferably within the recreational vehicle. The control system can be either an electrically-operated, motor control system or an electric pump, air-actuated control system. When the control system is initiated, it automatically actuates or activates an apparatus of rigid members through one or more control signals, causing the rigid members to pivot upwardly and/or outwardly from the roof or at least one side of the vehicle, thereby deploying the awning. Further, the control system can also be activated to automatically move the deployed awnings into a stored configuration.

In one embodiment, the shading system of the present invention has two awnings, one on either side of the vehicle, allowing the RV owner to choose from many different shading combinations. Specifically, the two awnings can be selectively deployed to shade: either or both sides of the vehicle, and the area adjacent the side(s); part or all of the roof of the recreational vehicle; or both the sides and the roof. Consequently, the user of the shading system has a great variety of shading options available, and can choose that shade set up that most meets the needs of a particular campsite location. Each awning is automatically deployed into an extended configuration from its rolled up, stowed position atop the recreational vehicle. The awning is guided by the pivoting of rigid members in response to signal-actuated motors governed by the control system. In any configuration, as the rigid members pivot, each awning is moved from its stowed position and deployed by the application of vector forces generated through the controlled movement of rigid members.

The feature of automatically deploying and storing the awnings not only provides an easy and convenient way of operating the shading system, but minimizes the time required to extend the awning. Additionally, the automatic feature prevents possible sore muscles, or even injury, to those who would otherwise need to manually set up the shading system. Further, being able to deploy the awnings to multiple positions permits the user to provide shading to not only the areas adjacent to the vehicle that would benefit from shading, but also the top of the vehicle, eliminating the significant heating caused by direct sunlight.

In one specific aspect of the present invention, top and side mechanisms are used for deploying and storing each awning. The top mechanism is preferably affixed to the roof of the vehicle, while the side mechanism is preferably located on at least one side of the vehicle. The top mechanism preferably consists of a pair of identical deploying and storing mechanisms located essentially along and at opposite ends of the centerline of the vehicle roof. Preferably also, each pair of the top mechanism includes at least one air piston, pivotally connected to an awning support structure. Movement of the piston causes the supporting structure to pivot, and thereby moves the attached awning to a deployed, shading position—or, returns the awning to its stored position. In another embodiment of the present invention, a motor driven gear mechanism and mounting structure(s) may replace the air piston and its associated structure(s).

The side mechanism includes a pair of deploying and storing mechanisms positioned along one or both sides of the recreational vehicle at substantially the front and the rear. In one preferred embodiment of the present invention, each of the deploying and storing mechanisms includes an air piston pivotally connected to an awning support structure, which in turn is connected to the awning. Again, movement of the air piston causes the support structure to pivot, thereby positioning the awning in accordance with signals received from the control system. In another embodiment of the present invention, a motor-driven gear mechanism and mounting structure(s) may replace the air piston and its associated structure(s) in the side mechanism. In such a case, to retract the awnings the user simply releases the air pressure applied to the air pistons, allowing a spring-biased roller mechanism attached to the awnings to retract and roll the awning into its normally stowed position.

In summary, the present invention represents a vehicle shading system that can be easily set up, provide shading for the vehicle as well as for people adjacent to the vehicle, and be operated automatically from the vehicle.

These and other features and advantages of the present invention are set forth more completely in the accompanying drawings and the following description.

BRIEF DESCRIPTION OF THE DRAWINGS

Details of the invention, and of the preferred embodiments thereof, will be further understood upon reference to the drawings, wherein.

DETAILED DESCRIPTION OF THE PREFERRED EMBODIMENTS

Figure 1:
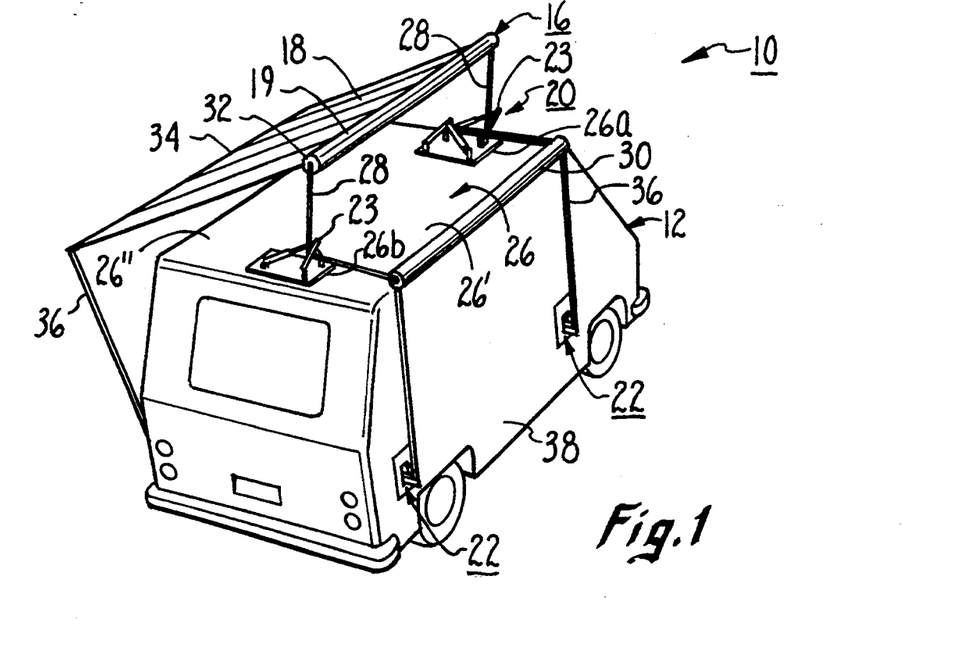
FIG. 1 is a perspective view showing a vehicle shading system of the present invention mounted on a typical recreational vehicle, with the awning illustrated in a deployed position.

Referring initially to FIG. 1, a vehicle shading system 10 is shown positioned on a recreational vehicle 12 ("RV") such as a trailer or a mobile home. In one preferred embodiment, the shading system 10 includes a pair of shading apparatus 16, one on either side of the vehicle 12. The shading apparatus 16 includes an awning 18 that is mounted on a retractable roller 19. Both the awning 18 and the roller 19 are of a type well known in the art. Further, each shading apparatus 16 also includes a top erection mechanism 20 and a side erection mechanism 22 for deploying and storing the awning 18.

The top erection mechanism 20 includes two separate pairs of identical-deploying top pivot assemblies 23 located essentially along a lengthwise centerline of a vehicle roof 26, and at substantially either end 26a, 26b thereof. A top extension arm 28 is provided each top pivot assembly 23, with the top extension arms 28 attached to respective ends of the roller 19. A first lateral edge 32 of the awning 18 is attached along the length of the roller mechanism 19, and a second lateral edge 34 of the awning 18 is attached to a pair of awning brace members 36, each of which are preferably positioned at opposite ends of the awning 18. The awning 18 is made out of a flexible material, such as canvas, that may easily be rolled onto and off of the retractable roller 19. In a preferred embodiment of the present invention, the awning 18 is approximately eighteen feet (18') long by fourteen feet (14') wide.

Figure 2:
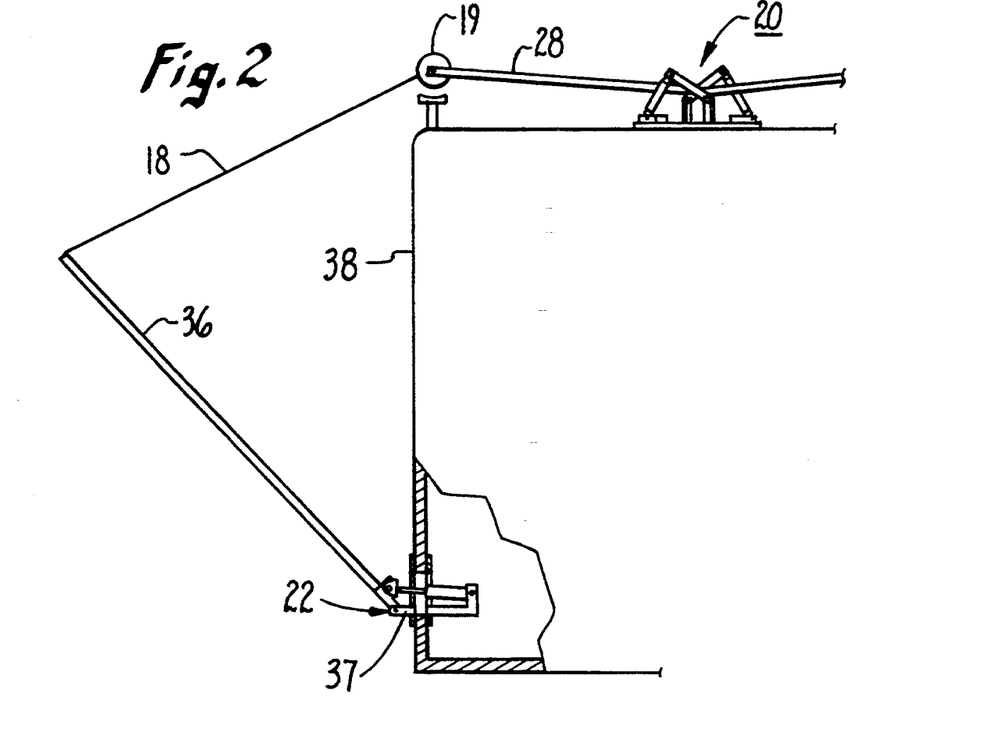
FIG. 2 is a side elevation view, partly in section and with portions broken away, further illustrating the general arrangement of the shading system of FIG. 1.

Referring now to FIG. 2, the general arrangement of one possible configuration of a preferred embodiment of the shading system 10 in accordance with the present invention is shown as viewed from the rear of the vehicle 12. As shown in FIG. 2, a side of the recreational vehicle 12, along with the ground area adjacent to that side, is shaded by the extended awning 18. The top erection mechanism 20 of the shading apparatus 16, through the top extension arm 28, is connected to the retractable roller 19. The awning 18 is shown in FIG. 2 as being extended out of the roller 19, with the second lateral awning edge 32 supported by the awning brace member 36.

Figure 3:
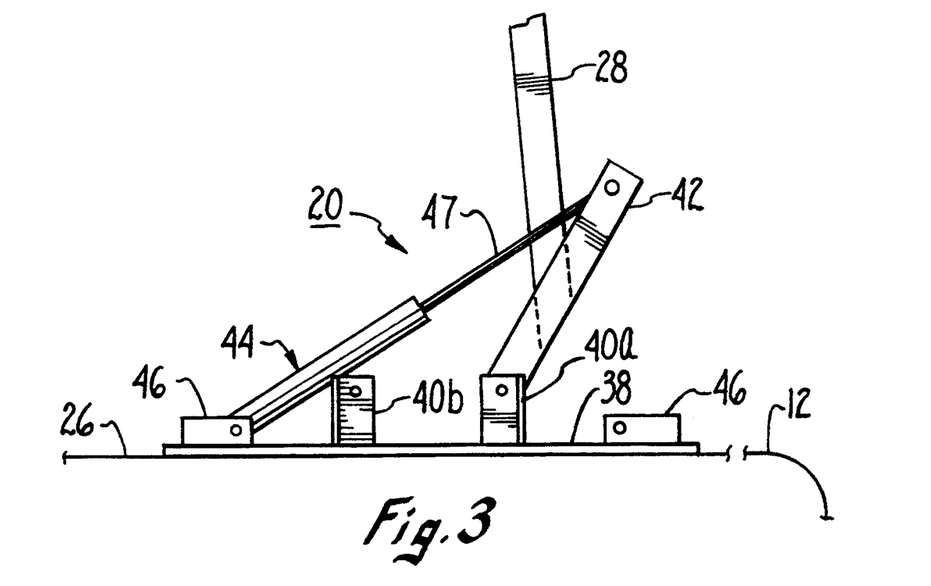
FIG. 3 is a partial side elevation view, with portions shown in phantom, of the top erection mechanism shown in FIG. 2.

When used with the awning of 18'×14' discussed above (and installed on a recreational vehicle having a length of twenty-five feet (25') and height of seven feet eight inches (7'8")), eight feet two inches (8'2") is an appropriate length for each of the awning brace members 36. A stationary side brace 37 is provided to pivotally attach each of the awning brace members 36 to the side erection mechanism 22. When in a stowed position (see FIGS. 5A and 5C), the side erection mechanism 22, through the action of the stationary side brace 37, acts to help secure the shading apparatus 16 to the vehicle 12 by holding the awning brace members 36 against the side of the recreational vehicle 12. The top and side erection mechanisms 20,22 will now be discussed in greater detail making reference to FIGS. 3 and 4. Turning first to FIG. 3, a steel base plate 38 is used to fixedly connect the top erection mechanism 20 to the roof 26 of the vehicle 12. A pair of vertical mounting braces 40a, 40b are attached to and extend from the steel base plate 38. The vertical mounting braces 40 are preferably metal brackets that have been welded to the base plate 38. A rigid brace strut 42 is pivotally connected to the vertical mounting brace 40a, preferably via a pin bolt (not shown) that extends through the mounting brace 40a and the brace strut 42. A first pair of air pistons 44 (only one shown in FIG. 3) are also pivotally attached to the base plate 38 using a pair of piston mounting brackets 46. A first piston rod 47 extends from the first piston 44 and is connected to the brace strut 42 at an end thereof opposite the connection of the piston 44 to the vertical mounting brace 40a. Consequently, when the piston rod 47 of the air piston 44 is fully extended, the rigid brace strut 42 pivots about the vertical mounting brace 40a.

The mechanical action generated by the extension and retraction of the piston rod 47 might best be discussed by also making reference to FIGS. 1 and 2. In use, the top extension arm 28 is rigidly connected, e.g., welded, to the brace strut 42, such that when the piston rod 47 of the air piston 44 is fully retracted (as shown in FIG. 2) the top extension arm 28 extends substantially parallel to the roof 26 of the recreational vehicle 12, and towards a lateral side thereof. When the piston rod 47 of the air piston 44 is fully extended (FIG. 3), the top extension arm 28 is substantially vertically extended, almost perpendicular to the roof 26 of the recreational vehicle 12.

In this preferred embodiment, the top extension arm 28 is made of one inch (1") box aluminum metal, and the vertical mounting brace 40 and the strut brace 42 are made of steel. The top extension arm 28 is approximately three feet, ten inches (3'10") in length, and the brace strut 42 is approximately 1 foot (1') in length. The top erection mechanism 20 is preferably attached to the base plate 38, consisting of a one quarter inch (¼") steel plate having the dimensions of 2 feet by 1 foot (2'×1'). The air piston 44 can be of a conventional design, including a commonly-available air shock manufactured for use with cars and trucks, such as a MONROE or GABRIEL brand shock, having a 150-pound maximum air pressure limit (catalog number U8433). These air pistons 44 are about nineteen and one-half inches (19178") in length when fully extended.

Figure 4:
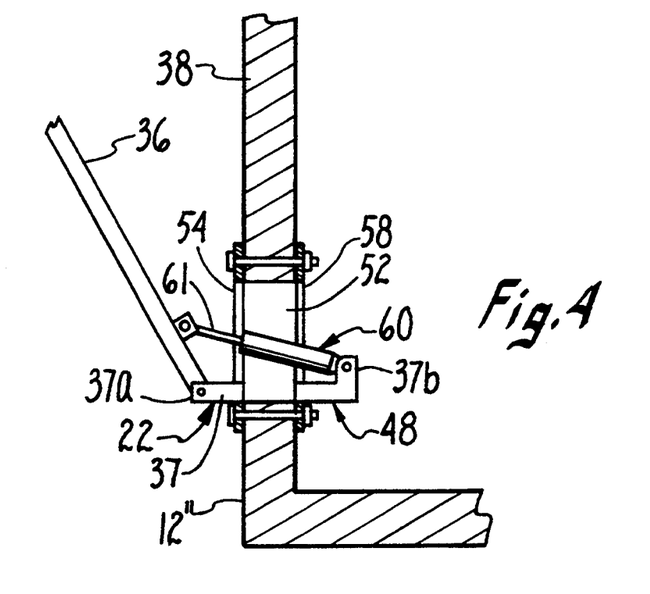
FIG. 4 is a partial side elevation view, partly in section, of the side erection mechanism shown in FIG. 2.

One of the side erection mechanisms 22 is shown in FIG. 4, and includes the "L"-shaped stationary side brace 37 that in fact consists of two separate pieces, an outer side brace 37a and an inner side brace 37b, that are attached together on either side of an outer side wall 38 of the vehicle 12 using a plurality of bolts/nuts or other convenient form(s) of attachment. If desired, a flexible cover (not shown) can be provided to seal over an aperture 52 formed in the side wall 38 by the side brace construction 37.

As previously discussed, an awning brace member 36 is pivotally connected to the outer side brace 37, preferably via a pin bolt (not shown) that extends through the awning brace member 36 and the side brace 37. A second pair of air pistons 60, which are substantially identical to the first air pistons 44 previously described, are each rigidly connected to the inner side brace 37b, also preferably by a pin bolt. A second piston rod 61 of the second air piston 60 is attached to the awning brace member 36 at a location substantially adjacent to the point of attachment of the awning brace member 36 to the outer side brace 37 at the first end 37a thereof, such that the side erection mechanism 22 forms a roughly, triangularly-shaped structure.

In use, when the second air piston 60 is fully retracted, the awning brace member 36 is substantially vertically oriented and parallel to the outer side wall 38 of the vehicle 12. Alternatively, when the piston rod 61 of the second air piston 60 is fully extended, as is shown in FIG. 4, the awning brace member 36 extends outwardly at an angle from the outer side wall 38 of the vehicle 12 and supports the extended awning 18.

In this preferred embodiment, the awning brace member 36 is made of one-inch (1") box aluminum metal, and is about 8 feet, two inches (8"2") in length. In an alternative embodiment, a motor driven gear mechanism and mounting structure may replace the above-described side erection mechanism 22. Other configurations for the side erection mechanism 22 are also possible to one skilled in the arm.

The next five FIGS., 5A-5E, illustrate five different representative positions or configurations of one preferred embodiment of the vehicle shading system 10 having the pair of shading apparatus 16. Specifically, the top and side erection mechanisms 20,22 cooperate to move each of the shading apparatus 16 into at least four different in or out configurations. Thus a great number of optional deployed configurations are possible with the shading system 10 of the present invention.

Figure 5A:
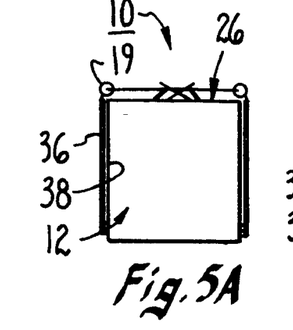
FIGS. 5A-E are side elevation views schematically illustrating the manner of operation of the vehicle shading system of the present invention.

FIG. 5A illustrates the vehicle shading apparatus 16 as it would be normally stowed. In this configuration, the retractable roller 19 is positioned adjacent the roof 26 of the recreational vehicle 12, and the rigid awning brace members 36 are stowed against the outer side wall 56 of the vehicle 12. As so configured, the piston rods 47,61 are not extended, permitting the retractable rollers 19 in the pair of shading apparatus 16 to fully receive the awnings 18 onto the roller 19. When retracted, the awning brace members 36 are pulled into a position substantially adjacent to and parallel with the outer side wall 56 of the vehicle 12, while the top extension arms 28 are pulled substantially adjacent to and parallel with the roof 26 of the vehicle 12. The vehicle shading apparatus 16, thus stowed, enables the vehicle 12 to be driven to or from a vacation spot with the awnings 18 protected from wind damage.

Figure 5B:
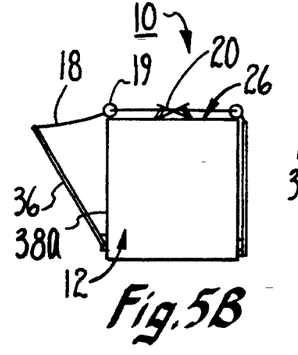

FIG. 5B, illustrates the vehicle shading system 10 in a configuration shading an area adjacent to only a left outer side wall 38a of the vehicle 12. Activation of the awning brace member 36 by the extension of the second air pistons 60 has resulted in the deployment of the awning 18 away from the left side wall 38a. Since the top erection mechanism 20 has not yet been activated, the roller 19 remains positioned adjacent to the roof 26. In this configuration, the shading apparatus 16 and the awning 18 provide shade to the area adjacent to the side of vehicle 12, where people may be relaxing or resting, and also to the left side wall 38a of the vehicle 12.

Figure 5C:
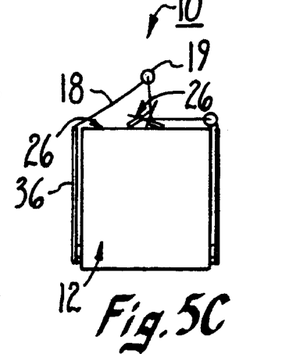

FIG. 5C illustrates the vehicle shading system 10 in a configuration shading only one part of the roof 26 of the vehicle 12. Extending the piston rods 47 of the first air pistons 44 in turn results in the activation of the top extension arm 28, to which the piston rods 47 are attached. The retractable roller 19 is thereby caused to move from its stowed position to a position located substantially vertically above and spaced from the center of the vehicle roof 26.

The awning 18 is unrolled from the retractable roller 19 as the roller pivots about the top erection mechanism 20, and stretches from its point of attachment to the stationary awning brace member 36 to the retractable roller 19. In this configuration, that portion of the roof 26 underlying the awning 18 is shaded. For certain positions of the vehicle 12 relative to the position of the sun, the direct rays of the sun are prevented from striking the outside walls of the vehicle 12, decreasing the amount of heat energy transferred to the interior portions of the vehicle 12. This in turn will tend to reduce the need to use fans or air conditioning within the vehicle 12. Another benefit of shading or covering the roof 26 may be to prevent rain or hail from drumming on the roof 26, thereby disturbing people inside of the vehicle 12.

Figure 5D:
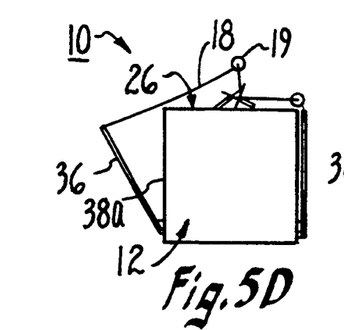

FIG. 5D shows the vehicle shading system 10 in a configuration shading an area adjacent to the left side 38a plus the left half of the roof 26 of the vehicle 12. Such a result is obtained by the selective activation of the first and second air pistons 44,60 for the left side 38a of the vehicle 12. In response to the extension of first piston rods 47, the retractable roller is raised in a manner as described in connection with FIG. 5C, above. The second piston rods 61 are likewise extended, resulting in the outward pivoting of the awning brace members 36 and movement of the awning 18 as is described above in connection with FIG. 5B. In this configuration, both an area adjacent to the left wall 38a and a portion of the roof 26 are shaded. People may relax outside under the shade along the side of the vehicle, while the inside of the vehicle 12 is kept relatively cool, compared to the result where the direct rays of the sum are permitted to strike the outer surface of the vehicle 12.

Figure 5E:
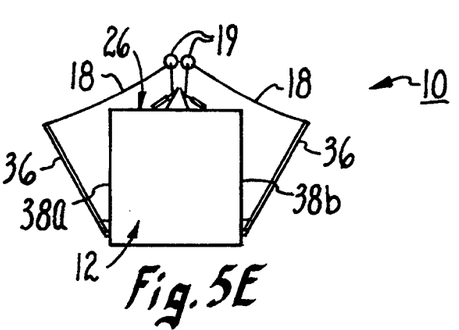

FIG. 5E illustrates the shading apparatus 16 in a configuration shading areas adjacent to the right and left sides 56a, 56b and the entire roof 26 of the vehicle 12. The deployment of the awning 18, the retractable roller 19, and the top and side erection mechanisms 20, 22 is identical to that described hereinabove for the one-half shaded configuration of FIG. 5D. By deploying the entire vehicle shading apparatus 16 the vehicle provides the user with the maximum amount of shade. Because areas adjacent to both sides 38a, 38b of the vehicle 12 are shaded, many more people are able to relax in shaded comfort. In addition, the shading over the entire roof 26 provides a cooler interior environment within the vehicle 12. This in turn maximizes the savings in energy costs, since fans or other cooling equipment do not need to be used as much as if the vehicle were baking in the direct sunlight. Additionally, should a sudden rain storm occur, people may sleep or rest more comfortably because the raindrops would fall upon the awning instead of drumming against the roof 26 and the side walls 38.

It is clear to one skilled in the art, and from the foregoing descriptions for FIGS. 5A–5E, that depending upon the manner of shading required, other beneficial awning configurations are possible. For instance, an area adjacent to the right side wall 38b of the vehicle 12 may be shaded, while the left side of the roof 26 is shaded. Another possibility is for the left side wall 38a to have the shading apparatus 16 stowed, while areas adjacent to the right side wall 38b and the entire roof 26 of the vehicle 12 are shaded.

Thus, the top and side erection mechanisms 20,22 permit the awning 18 to be set in one of numerous positions. For example, the awning 18 can be stowed, it can be partially extended to shade an area adjacent to the right side 38b of the vehicle 12, extended to shade the roof 26 of the vehicle 12, or extended to shade both an area adjacent to the right side 38b and the roof 26 of the vehicle 12. The advantage of having multiple positions of the awning 18 is to provide shading on areas adjacent to the sides 38a, 38b that need shading as well as the roof 26 of the vehicle 12—all in an effort to keep the inside the vehicle 12 out of the direct sunlight and cool or cooler than previously possible.

Figure 6:
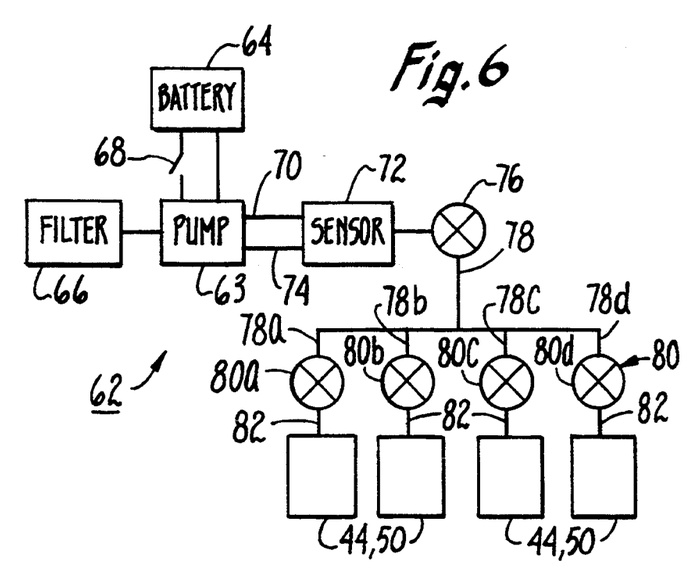
FIG. 6 is a schematic view of one embodiment of a control system for the shading system of the present invention.

FIG. 6 is a schematic illustration of an exemplary control circuit 62 for the shading system 10 of the present invention. By making use of this control system, the user of the recreational vehicle 10 may automatically deploy the shading system to any of the configurations shown in FIGS. 5A–5E, above. In this preferred embodiment, the control system 62 is an air-based control system that selectively provides pressurized air to the pairs of air pistons 44,60 to deploy the shading apparatus 16 and awnings 18 to the desired configurations.

Specifically, the control system 62 includes an electric air pump 63 that is powered by a battery 64, and receives air from an intake through an air filter 66. Of course, other sources of electrical power are also appropriate, such as motor-powered generators or, at some recreational vehicle locations, electrical plug-in connections. The pump 63 is connected to the battery 64 or other source of power through an on/off switch 68. Control of the power permits the user to be able to selectively activate and de-activate the control circuit 14, and through it, consequently the automated shading system 10. The pump 63 can be any one of a number of common commercially-available air pumps suitable for use with car or truck batteries, and that can supply pressurized air at a pressure of preferably two hundred and fifty pounds of pressure per square inch (250 psi).

The pump 63 provides the pressurized air to a main output line 70. A pressure sensor 72 senses the amount of pressure in the main output line 70 and provides feedback to the air pump 63 along a feedback circuit 74. When the air pump 63 is activated, the pressure sensor 72 and the feedback circuit 74 sense the amount of pressure in the main output line 70. When this pressure drops below a selected minimum, the pressure sensor 72 sends a signal along the feedback circuit 74 to the air pump 63, causing the pump 63 to begin operating to increase the pressure in the main output line 70. Further, when the pressure sensor 72 detects that the pressure in the main output line 70 is at a sufficiently high level (when the air pump 63 is operating), the pressure sensor 72 sends a signal along the feedback circuit 74 to the air pump 63, stopping the operation of the air pump 63.

In this fashion, the pressure sensor 72 and the feedback circuit 74 can maintain an acceptable amount of pressure in the main output line 70 and can limit the operation of the air pump 63 (and the resulting drain on the battery 64) to only when it is necessary to re-pressurize the main output line 70 to the required level. Preferably, for this embodiment, the pressure sensor 72 turns on the air pump 63 when the pressure in the main output line 70 drops below ninety five pounds per square inch (95 psi) and turns the air pump 63 off when the pressure reaches one hundred and twenty five pounds per square inch (145 psi).

The main output line 70 is connected to a main control valve 76, which preferably is a standard, commercially-available hand operated pressure valve rated to operate at two hundred and fifty pounds of pressure per square inch (250 psi). When the main control valve 76 is open, the pressure in the main output line 70 is communicated to a network of secondary pressure lines 78, such that the pressure is substantially equalized between the main output line 70 and the secondary output lines 78. When the main control valve 76 is closed, however, the secondary pressure lines 78 are isolated from the main output line 70. Further, the main control valve 76 can also be used as a pressure release valve where the pressurized air in the secondary pressure lines 78 can be selectively discharged to the outside atmosphere through the main control valve 76.

The network of secondary pressure lines 78 is preferably comprised of a branched network of four secondary lines 78a–78d, respectively. On each of the four secondary lines 78a–78d there is a two-way secondary control valve 80. Each of the secondary control valves 80a–80d are preferably identical, commercially available, hand-operated pressure valves rated for two hundred and fifty pounds of pressure (250 psi) having an "on" and an "off" position. When the secondary control valve 80 is in the "on" position, the pressurized air in the secondary pressure lines 78 is communicated via an external pressure line 82 to either the first or second pair of the air pistons 44,60.

For example, in one configuration the control valve 80a might provide air to the second pair of air pistons 60 contained in the side erection mechanism 22 on the right side 38b of the recreational vehicle 12, and the control valve 80b might provide air to the first pair of air pistons 44 contained in the top erection mechanism 20 on the right side 38b of the vehicle 12. Continuing, the control valve 80c might then provide air to the second set of the second pair of air pistons 60 in the side erection mechanism 22 on the left side 38a of the vehicle 12, and the control valve 80d might provide air to the second set of the first pair of air pistons 44 in the top erection mechanism 20 on the left side 38a of the vehicle 12.

Hence, the user of the vehicle shading system 10 of the present invention can deploy each of the awnings 18 by simply actuating an appropriate pair of the air pistons 44,60. Specifically, if the user desires to use the vehicle shading system 10, the user first activates the air pump 62 by turning on the on/off switch 68 so that pressure builds in the main output line 70 to the optimum level. Subsequently, the user opens the main control valve 76 to permit the flow of pressurized air in the main output line 70 to the secondary pressure lines 78a–78d. At this point, the user can then select to deploy the vehicle shading system 10 into various different configurations by selectively opening the secondary control valves 80a–80d.

For example, if the user wishes to shade both the area adjacent to the right side 38b of the vehicle 12 and the roof 26 on the left side 38b of the vehicle 12, the user opens the control valves 80a and 80d. Once opened, pressurized air from the air pump 62 is communicated to the first set of the second pair of air pistons 60 and the second set of the first pair of air pistons 44 in the right side erection mechanism 22 and the left side top erection mechanism 20, respectively.

The air pistons 44 in the upper left-hand side, top erection mechanism 20 extend as a result of receiving the pressurized air from the control valve 80d, causing the roller 19 and the awning 20 to be lifted over the roof 26 (see FIGS. 1 and 2). Since the second lateral edge 34 of the awning 18 is fixedly secured to the rigid awning members 36 on the left side 38a of the vehicle 12, movement of the roller 19 in this fashion results in the awning 18 extending from substantially the left side 38a of the vehicle 12 to the roller 19 vertically positioned over the centerline of the roof 26.

Similarly, the two second pair of air pistons 60 located in the right-hand side erection mechanism 22, extend outward (upon receiving the pressurized air from the control valve 80a), causing the two right-hand side awning brace members 36 to pivot outward. Since the rigid brace members 36 are fixedly attached to the second lateral edge 34 of the awning 18, the outward pivoting motion results in the awning 18 being drawn out from the roller 19 so that the awning 18 is deployed in the configuration shown in FIGS. 2 and 5B.

Once the awnings 18 are fully deployed in the configuration desired by the user, the user can secure the awnings 18 in their deployed configuration by closing the control valves 80a and 80d (assuming there are no air leaks in the external pressure line 82 between the secondary control valves 80 and the respective air pistons 44, 60). Consequently, when the secondary control valves 80 are closed after having been opened to deploy the air pistons 44, 60, the air pistons 44, 60 remain pressurized and extended, maintaining the awnings 18 in their deployed positions indefinitely.

When the user desires to stow the awnings 18 after they have been deployed, all that must be done is to open the secondary control valves 80, releasing the pressure being applied to the air pistons 44, 60. The pressure is released from the control system 62 via the main control valve 76, and opening the secondary control valves 80, releasing the pressure in the external pressure lines 82 being applied to the pistons 44, 60 as well. Once the pressure is released, the roller 19 retracts or rolls the awning 18 into its stored configuration.

For the awning 18 that was deployed in the above example over the left-hand side 38a of the roof 26 of the recreational vehicle 12, the retraction of the awning 18 draws the awning 18 and the roller 19 towards the vehicle 12. With the air pistons 44, 60 no longer generating a force in opposition to the forces produced by the retractable roller 19, the awning brace 36 and the retractable roller 19 retract to their stored configuration about the vehicle 12. Similarly, the awning 18 deployed on the right side 38b of the recreational vehicle 12 retracts about the roller 19, drawing the second edge 34 of the awning 18 and the attached awning brace members 36 towards the right side 38b of the recreational vehicle 12. Upon releasing the air pressure the air pistons 60 are no longer able to oppose the retraction forces produced by the roller mechanism 19.

Consequently, the user of the vehicle shading system 10 of the present invention can provide shade for the recreational vehicle 12 by simply opening and closing a series of valves. Not only can the user selectively shade an area adjacent to one side of a recreational vehicle 12, the user can shade the roof 26 of the vehicle 12, thereby reducing the amount of directly incident sunlight on the recreational vehicle 12. This can result in significantly lower temperatures in the interior of the vehicle 12. A further advantage of being able to erect an awning 18 over the roof 26 of the recreational vehicle 12 is that during rainstorms or hailstorms, the rain and hail will fall primarily on the awning 18 and not on the roof 26, which minimizes the sound otherwise created inside of the vehicle 12 when the rain and hail hits the roof 26.

The foregoing description has described one preferred embodiment of the vehicle shading system 10. The specific embodiment has described a shading system 10 that incorporates an air pump 63, secondary control valves 80, and several air pistons 44, 60 to automatically deploy two awnings 18. The deployed configurations include shading either the roof 26 and/or one side or both the roof 26, and one or both sides of the recreational vehicle 12. As can be appreciated by a person skilled in the art, the same automated shading system could also be accomplished by using an electric power source, such as a battery in the place of the air pump 62, switches in the place of the control valves 80, and electric motors in the place of the air pistons 40, 55.

Consequently, while the foregoing description has described the principle and operation of the present invention, in accordance with the provisions of the patent statutes, it should be understood that the invention may be practiced otherwise then as illustrated and described above, without departing from the spirit and scope of the invention.

What is claimed is:

1. A vehicle shading system, comprising:
   a control system-responsive to manipulation of at least one of a plurality of user operable devices;
   an awning which is normally in a stowed position atop a vehicle;
   a top mechanism operably engaged with said awning, responsive to said devices from said control system, wherein said top mechanism automatically deploys said awning into a first position, such that said awning shades a first portion of a roof of said vehicle; and
   a side mechanism spaced from said top mechanism and operably engaged with said awning, responsive to said devices from said control system, positioned in a side of said vehicle which automatically deploys said awning into a second position such that said awning shades an area adjacent to a first side of said vehicle.

2. The vehicle shading system as defined in claim 1, wherein said control system comprises an air pump and piston actuated system, and said user operable devices are comprised of a plurality of hand operated two-way control valves.

3. The vehicle shading system as defined in claim 1, wherein said control system is an electrical motor actuated system, using a plurality of user operable electric two pole switches.

4. The vehicle shading system as defined in claim 1, wherein said awning is deployed and retracted out of a roller mechanism which uses spring tension to urge said awning into said normally stowed position.

5. The vehicle shading system as defined in claim 1, wherein said top mechanism comprises at least a first air piston responsive to said user operable devices, said first air piston operably engaged with said awning so that actuation of said first air piston results in deployment of said awning to said first position.

6. The vehicle shading system as defined in claim 5, wherein said first air piston, upon activation, causes said roller mechanism to pivot upwardly to a substantially vertical position above said roof of said vehicle causing said awning to deploy out of said roller mechanism to said first position so that said awning substantially shades a first portion of said roof.

7. The vehicle shading system as defined in claim 1, wherein said side mechanism comprises at least a second air piston, independently operable from said top mechanism, responsive to said user operable devices, said second air piston operably engaged with said awning so that actuation of said second air piston results in deployment of said awning to said second position.

8. The vehicle shading system as defined in claim 7, wherein said second air piston, upon activation, causes an awning brace member to pivot outwardly from a stowed position on said first side of said recreational vehicle causing said awning to deploy out of said roller mechanism to said second position, so that said awning shades an area adjacent said side of said vehicle.

9. A vehicle shading system, comprising:
   a control system, having a first and second number of control devices responsive to manipulation of at least one of a first and second set of user operable devices;
   a first and a second awning, which are normally in stowed positions atop a vehicle, independently deployable using said control system, said first and second awnings having a first position shading a first and second portion of a roof of said vehicle respectively and a second position shading an area adjacent to a first and a second side of said vehicle respectively;
   a first and second top mechanism operably engaged with said first and second awnings, respectively responsive to one of said first and said second number of control devices, wherein each of said first and second top mechanisms automatically and independently deploys each of said first and second awnings into said first positions; and
   a first and second side mechanism spaced from said first and second top mechanism and operably engaged with each of said first and second awnings and responsive to one of said first and said second number of control devices respectively, positioned in at least one side of said vehicle which automatically and independently deploys each of said first and second awnings into said second position.

10. The vehicle shading system as defined in claim 9, wherein said control system comprises an air pump and piston actuated system, having a first and second number of devices comprised of a plurality of hand operated two-way control valves.

11. The vehicle shading system as defined in claim 9, wherein said control system comprises an electrical motor actuated system, using a plurality of user operable electric two pole switches.

12. The vehicle shading system as defined in claim 9, wherein each of said first and second awnings is deployed and retracted out of a roller mechanism which uses spring tension to urge said first and second awnings into said normally stowed position.

13. The vehicle shading system as defined in claim 9, wherein each of said first and second top mechanisms comprises at least a first air piston responsive to said control devices, wherein said first air piston is operably engaged with one of said first and second awnings so that actuation of said first air piston results in deployment of said awning to said first position.

14. The vehicle shading system as defined in claim 13, wherein each of said first air pistons, upon activation, causes said roller mechanism to pivot upwardly to a substantially vertical position above said roof of said vehicle causing one of said first and second awnings to deploy out of said roller mechanism to said first position so that each of said first and second awnings substantially shades a first portion of said roof.

15. The vehicle shading system as defined in claim 9, wherein each of said first and second side mechanisms comprises at least a second air piston independently actuated from each of said first and second top mechanisms, responsive to said control devices, said second air piston operably engaged with one of said first and second awnings so that actuation of said second air piston results in deployment of said awning to said second position.

16. The vehicle shading system as defined in claim 15, wherein each of said second air pistons, upon activation, causes an awning brace member to pivot outwardly from a stowed position on one of said first and said second side of said vehicle causing each of said first and second awnings to deploy out of one of said roller mechanisms to said second position, so that each of said first and second awnings shades an area adjacent to said one of said first and said second side of said vehicle.

17. A vehicle shading system, comprising:
a control means operably engaged with at least one vehicle shading apparatus normally in a stowed position atop the roof of said vehicle, said apparatus having a plurality of user operable devices for automatically deploying and retracting said at least one vehicle shading apparatus;
a shading means incorporated into said vehicle shading apparatus for providing shade on a vehicle and adjacent areas;
a first and second deploying means said first deploying means spaced from said second deploying means, said first and second deploying means incorporated into said vehicle shading apparatus for independently deploying said shading means over at least one of: a first and a second portion of a roof and areas adjacent to a first and second side of said vehicle; and
retracting means incorporated into said vehicle shading apparatus for independently retracting said shading means.

18. The vehicle shading system as defined in claim 17, wherein said control means comprises an air pump actuated system having a first and second number of said devices further comprising a plurality of hand operated two-way control valves.

19. The vehicle shading system as defined in claim 17, wherein said control means comprises an electrical motor actuated system, using a plurality of user operable electric two pole switches.

20. The vehicle shading system as defined in claim 17, wherein said shading means comprises a first and a second awning deployed and retracted out of a roller mechanism which uses spring tension to urge said first and second awnings into a normally stowed first position.

21. The vehicle shading system as defined in claim 20, wherein said first deploying means comprises a first and second top mechanism independently operably engaged with each of said first and second awnings, responsive to one of said user operable devices, said first and second top mechanisms automatically and independently deploys each of said first and second awnings into said first position, such that said first and second awnings may shade at least one of a right side and a left side of said roof of said vehicle.

22. The vehicle shading system as defined in claim 21, wherein each of said top mechanisms comprises at least a first air piston responsive to said user operable devices, said first air piston operably engaged with one of said first and second awnings so that actuation of said first air piston results in deployment of said awning to said first position.

23. The vehicle shading system as defined in claim 22, wherein each of said first air pistons, upon activation, causes said roller mechanism to pivot upwardly to a substantially vertical position above said roof of said vehicle causing one of said first and second awnings to deploy out of said roller mechanism to said first position so that each of said first and second awnings substantially shades a first portion of said roof.

24. The vehicle shading system as defined in claim 20, wherein said second deploying means comprises a first and second side mechanism independently operably engaged with each of said awnings, responsive to one of said user operable devices, positioned in at least one side of said vehicle which automatically and independently deploys each of said first and second awnings into a second position, such that said first and second awnings may shade at least one area adjacent to said first and said second side of said vehicle.

25. The vehicle shading system as defined in claim 24, wherein each of said first and second side mechanisms comprises at least a second air piston independently actuated from each of said first and second top mechanisms, responsive to said user operable devices, said second air piston operably engaged with one of said first and second awnings so that actuation of said second air piston results in deployment of said awning to said second position.

26. The vehicle shading system as defined in claim 24, wherein each of said second air pistons, upon activation, causes an awning brace member to pivot outwardly from a stowed position on one of said first and said second side of said vehicle causing each of said first and second awnings to deploy out of one of said roller mechanisms to said second position, so that each of said first and second awnings shades an area adjacent to said one of said first and said second side of said vehicle.

27. The vehicle shading system as defined in claim 20, wherein said retracting means comprises a plurality of roller mechanisms which use spring tension to urge said shading means into at least one of a normally stowed position.

* * * * *